United States Patent
Sen et al.

(10) Patent No.: US 11,254,852 B2
(45) Date of Patent: Feb. 22, 2022

(54) FUNCTIONALIZED POLYALKYLENEIMINE CEMENT RETARDER

(71) Applicant: Halliburton Energy Services, Inc., Houston, TX (US)

(72) Inventors: Tamal Kumar Sen, West Bengal (IN); Vaishali Mishra, Bangalore (IN); Shreya Mohan, Nainital (IN); Samuel J. Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/644,132

(22) PCT Filed: Oct. 27, 2017

(86) PCT No.: PCT/US2017/058804
§ 371 (c)(1),
(2) Date: Mar. 3, 2020

(87) PCT Pub. No.: WO2019/083546
PCT Pub. Date: May 2, 2019

(65) Prior Publication Data
US 2020/0407623 A1    Dec. 31, 2020

(51) Int. Cl.
| | | |
|---|---|---|
| *C09K 8/467* | (2006.01) | |
| *C04B 14/04* | (2006.01) | |
| *C04B 24/12* | (2006.01) | |
| *C04B 28/04* | (2006.01) | |
| *E21B 33/14* | (2006.01) | |
| *C04B 103/22* | (2006.01) | |

(52) U.S. Cl.
CPC .............. *C09K 8/467* (2013.01); *C04B 14/04* (2013.01); *C04B 24/121* (2013.01); *C04B 28/04* (2013.01); *E21B 33/14* (2013.01); *C04B 2103/22* (2013.01); *C04B 2201/20* (2013.01)

(58) Field of Classification Search
CPC ....... C09K 8/467; C04B 14/04; C04B 24/121; C04B 28/04; C04B 2103/22; C04B 2201/20; E21B 33/14
See application file for complete search history.

(56) References Cited

U.S. PATENT DOCUMENTS

| | | |
|---|---|---|
| 4,401,472 A | 8/1983 | Gerber |
| 4,468,252 A | 8/1984 | Crump et al. |
| 5,184,680 A | 2/1993 | Totten et al. |
| 9,255,454 B2 | 2/2016 | Lewis et al. |

(Continued)

FOREIGN PATENT DOCUMENTS

| | | |
|---|---|---|
| EP | 0444542 B1 | 9/1991 |
| EP | 2841391 A1 | 3/2015 |

OTHER PUBLICATIONS

ISRWO International Search Report and Written Opinion for PCT/US2017/058804 dated Jul. 26, 2018.

*Primary Examiner* — Crystal J. Lee
(74) *Attorney, Agent, or Firm* — Thomas Rooney; C. Tumey Law Group PLLC

(57) ABSTRACT

A variety of systems, methods and compositions are disclosed, including, in one method, a method of cementing may comprise: providing a cement composition comprising a hydraulic cement, water, and a functionalized polyethyleneimine retarder; placing the cement composition in a selected location; and allowing the cement composition to set.

20 Claims, 5 Drawing Sheets

(56) References Cited

U.S. PATENT DOCUMENTS

| | | |
|---|---|---|
| 9,328,281 B2 | 5/2016 | Agapiou et al. |
| 9,328,583 B2 | 5/2016 | Pisklak et al. |
| 9,371,712 B2 | 6/2016 | Boul et al. |
| 9,441,151 B2 | 9/2016 | Reddy et al. |
| 9,598,631 B2 | 3/2017 | Recio, III et al. |
| 9,644,130 B2 | 5/2017 | Recio, III et al. |
| 9,701,886 B2 | 7/2017 | Muthusamy et al. |
| 9,783,727 B2 | 10/2017 | Lahman et al. |
| 9,790,132 B2 | 10/2017 | Pisklak et al. |
| 9,828,541 B2 | 11/2017 | Agapiou et al. |
| 9,856,167 B2 | 1/2018 | Lewis et al. |
| 9,869,155 B2 | 1/2018 | Pisklak et al. |
| 9,878,949 B2 | 1/2018 | Pisklak et al. |
| 9,920,235 B2 | 3/2018 | Boul et al. |
| 10,106,719 B2 | 10/2018 | Muthusamy et al. |
| 10,125,302 B2 | 11/2018 | Mishra et al. |
| 10,195,764 B2 | 2/2019 | Agapiou et al. |
| 10,202,751 B2 | 2/2019 | Pisklak et al. |
| 10,428,259 B2 | 10/2019 | Goel et al. |
| 2006/0081155 A1 | 4/2006 | Chatterji et al. |
| 2007/0062415 A1* | 3/2007 | Guevara ............... C04B 16/082 106/638 |
| 2014/0090843 A1* | 4/2014 | Boul ...................... C09K 8/473 166/293 |
| 2017/0130115 A1* | 5/2017 | Ballard ................. C09K 8/426 |
| 2017/0306213 A1* | 10/2017 | Morgan ................. C04B 28/06 |

* cited by examiner

US 11,254,852 B2

FUNCTIONALIZED POLYALKYLENEIMINE CEMENT RETARDER

BACKGROUND

Cement compositions may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into a wellbore annulus between the walls of the well bore and the exterior surface of the pipe string disposed therein or between the pipe string and a larger conduit. The cement composition may set in the annular space, thereby forming an annular sheath of hardened, substantially impermeable cement (i.e., a cement sheath) that may support and position the pipe string in the well bore and may bond the exterior surface of the pipe string to the subterranean formation or larger conduit. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like. Cement compositions also may be used in surface applications, for example, construction cementing.

Subterranean cementing operations generally occur under a wide variety of well bore conditions, for example, ranging from shallow wells (less than about 1,000 feet) to extremely deep wells (greater than about 35,000 feet). A fluid is considered to be in a pumpable fluid state where the fluid has a consistency of less than 70 Bearden units of consistency ("Bc"), as measured using a pressurized consistometer in accordance with the procedure for determining cement thickening times set forth in API RP Practice 10B-2, *Recommended Practice for Testing Well Cements*, First Edition, July 2005. The time a cement composition remains in a pumpable fluid state is generally referred to as the thickening time. Conventional set retarders often have been included in cement compositions, so as to retard the set time of the cement composition until the cement composition has reached its ultimate location within the subterranean formation.

BRIEF DESCRIPTION OF THE DRAWINGS

These drawings illustrate certain aspects of some of the systems, methods and compositions of the present disclosure, and should not be used to limit or define the systems, methods and/or cement compositions.

DETAILED DESCRIPTION

Figure 1:
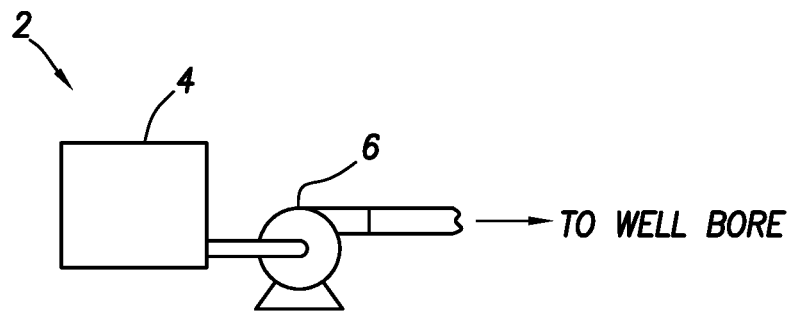
FIG. 1 is a schematic diagram that illustrates a system for preparation and delivery of a cement composition to a wellbore in accordance with certain examples.

Systems, methods, and compositions are directed to cementing operations and, in certain systems and methods, to cement compositions comprising a functionalized polyalkyleneimine retarder and methods of cementing with the functionalized polyalkyleneimine retarder in subterranean applications. While the systems, compositions, and methods may be useful in a variety of applications, they may be particularly useful for subterranean well completion and remedial operations, such as primary cementing of casings and liners in well bores, including those in production wells, which include multi-lateral subterranean wells. They also may be useful for surface cementing operations, including construction cementing operations. Additionally, they may be useful for offshore cementing applications.

There may be several potential advantages to the systems, methods and cement compositions of the present disclosure, only some of which may be alluded to herein. One of the many potential advantages of the systems, methods and cement compositions of the present disclosure is that the functionalized polyalkyleneimine retarder may be used at a wide range of temperatures. One skilled in the art would appreciate that it may also be used at higher temperatures, reducing the amount of retarder needed for a cementing job. Another potential advantage of the systems, methods and cement compositions of the present disclosure is that the functionalized polyalkyleneimine retarder does not require an additional set retarder. This may be particularly useful for operations offshore, as it may reduce the rig space requirement and logistics.

The cement compositions may comprise a cement, a functionalized polyalkyleneimine retarder, and water. Those of ordinary skill in the art will appreciate that the cement compositions generally should have a density suitable for a particular application. By way of example, the cement composition may have a density in the range of from about 4 pounds per gallon ("ppg") (479.3 kilogram per cubic meter ("kg/m$^3$")) to about 25 ppg (2,996 kg/m$^3$). In certain embodiments, the cement compositions may have a density in the range of from about 8 ppg (958.6 kg/m$^3$) to about 17 ppg (2,037 kg/m$^3$). The cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

The cement compositions may comprise a cement. Any of a variety of cements suitable for use in subterranean cementing operations may be used in accordance with the methods and cement compositions of the present disclosure. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. In certain methods and cement compositions, the hydraulic cement may comprise a Portland cement. Portland cements that may be suited for use in some methods and cement compositions of the present disclosure may be classified as Class A, C, H and G cements according to American Petroleum Institute, API Specification for Materials and Testing for Well Cements, API Specification 10, Fifth Ed., Jul. 1, 1990. In addition, in some methods and cement compositions, hydraulic cements suitable for use in the present disclosure may be classified as ASTM Type I, II, or III.

The cement may be included in the cement compositions in any suitable amount, including, but not limited to, about 20% to about 80% by weight of the cement composition. Suitable amounts may include, but are not limited to, 20%, 30%, 40%, 50%, 60ˆ, 70%, or 80% by weight of the cement composition. Those of ordinary skill in the art, with the benefit of this disclosure, should be able to select an appropriate concentration of the cement for a particular application.

The cement compositions may comprise a functionalized polyalkyleneimine retarder. The functionalized polyalkyleneimine retarder may comprise a polymer with repeating units comprising an amine group and an aliphatic spacer, wherein one or more of the amine groups on the polyalkyleneimine have been replaced with functional groups. Any suitable aliphatic spacers may be used, including two carbon aliphatic spacers and three carbon aliphatic spacers. The number of repeating units may be provided in any suitable amount, including, but not limited to, from about 1 to about 1,000 repeating units. The functionalized polyalkyleneimine retarder may be included in the cement composition because of its control over the thickening time at high and low temperatures. In addition, the functionalized polyalkyleneimine retarder may not show deterioration on the strength development at various temperatures. The functionalized polyalkyleneimine retarder may be present in any amount suitable, including an amount of about 0.01% by weight of cement ("BWOC") to about to about 10% BWOC. The functionalized polyalkyleneimine retarder may be present in the cement composition in an amount of about 0.01% BWOC to about 5% BWOC, or about 0.1% BWOC to about 1% BWOC. Suitable amounts of the functionalized polyalkyleneimine retarder may include, but are not limited to, 0.01% BWOC, 0.1% BWOC, 0.5% BWOC, 1% BWOC, 2% BWOC, 4% BWOC, 6% BWOC, 8% BWOC, or 10% BWOC.

A generic structure of a suitable functionalized polyalkyleneimine retarder is provided below:

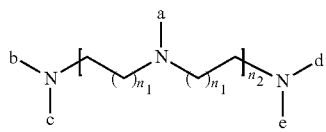

Where $n_1$ can from range 1 to 10, $n_2$ can have range from 1 to 1,000, and a, b, c, d, and e may be H, an alkyl group, $CH_2H_2PO_3$, $(CH_2)_3SO_3H$, or any combination thereof, wherein at least one of a, b, c, d, e is $CH_2H_2PO_3$.

The functionalized polyalkyleneimine retarder may be synthesized by any suitable reaction mechanism, including, but not limited to, functionalizing any suitable polyalkyleneimine with an aldehyde and an acid. In a non-limiting example, the aldehyde used for synthesis may be formaldehyde. The acid used during synthesis may be, but is not limited to, phosphorous acid, sulfonic acid, propanesulfonic acid, carboxylic acid, and or any combination thereof. The polyalkyleneimine may be branched, hyperbranched, or linear. Examples of suitable polyalkyleneimines include, but are not limited to, polyethyleneimine (PEI), polypropyleneimine, and poly(butylene imine). A suitable polyalkyleneimine may have a number average molecular weight in the range of about 250 to about 500,000, or from about 400 to about 10,000, or from about 400 to about 3,000. Suitable number average molecular weights for polyalkyleneimine may include, but are not limited to, 250, 350, 450, 550, 650, 750, 850, 950, 1,050, 2,000, 3,000, 4,000, 5,000, 6,000, 7,000, 15,000, 30,000, 60,000, 120,000, 240,000, 400,000, or 500,000. As used herein, the term "number average molecular weight" generally refers to a molecular weight measurement that is calculated by dividing the total weight of all the polymer molecules in a sample with the total number of polymer molecules in the sample. Experimentally, the number average molecular weight is determined by analyzing a sample divided into molecular weight fractions of species i having n the number of molecules. The number average molecular weight can be measured by a variety of well-known methods including gel permeation chromatography characterization based on a narrow distribution of polyethylene glycol and polyethylene oxide calibration standards, spectroscopic end group analysis and osmometry. A person skilled in the art will recognize the appropriate method for determining the number weight molecular average for a particular application.

Once the synthesis occurs, at least a portion of the side chain groups attached to the main chain of the polyalkyleneimine will be replaced with functional groups, that is they will be functionalized. Examples of these functional groups may include, but are not limited to, a salt or ester of an acid. Non-limiting examples of a salt or an ester of an acid may include phosphonates, sulfonates, carboxylates, nitrate, hydroxyl, or any combination thereof. One skilled in the art, with the benefit of this disclosure, will recognize the appropriate functional group for a particular application.

The water used in the cement compositions may be fresh water or salt water. As used herein, the term "salt water" refers to unsaturated salt water and saturated salt water, including brines and seawater. Generally, the water may be from any source, provided that it should not contain an excess of compounds that may undesirably affect other components in the cement composition. Further, the water may be present in an amount sufficient to form a pumpable slurry. Suitable amounts of water may be present in the cement composition in an amount including, but not limited to, about 33% to about 200% BWOC. For example, the water may be present in the cement composition in the range of about 35% to about 70% BWOC. Suitable amounts of water may include, but are not limited to, 30%, 50%, 70%, 90%, 110%, 130%, 150%, 170%, 190%, or 200% BWOC. One of ordinary skill in the art with the benefit of this disclosure will recognize the appropriate amount of water for a chosen application.

The cement composition may include a strength retrogression additive. Any suitable strength retrogression additive may be used. Suitable strength retrogressive additives may include, but are not limited to, coarse silica flour, fine silica flour, and or a combination thereof. The strength retrogression additive may be present in any suitable amount. Suitable amounts may include, but are not limited to, about 20% to about 75% BWOC, or about 25% to about 35% BWOC. Suitable amounts of strength retrogressive additive may include, but are not limited to, 20%, 25%, 30%, 35%, 40%, 45%, 50%, 60%, 70%, or 75% BWOC. Those of ordinary skill in the art, with the benefit of this disclosure, will be able to select the appropriate type and amount of the strength regression additive to include in the cement compositions of the present invention for a particular application.

The cement compositions may include a fluid loss control additive to reduce the loss of fluid, i.e., water, from the cement compositions when they contact permeable subterranean formations or zones. Excessive fluid loss causes a cement composition to be prematurely dehydrated which limits the amount of cement composition that can be pumped, decreases the compressive strength of the cement composition and prevents or reduces bond strength between the set cement composition and a subterranean zone, the walls of pipe and/or the walls of the well bore. Certain polymers have been used heretofore as fluid loss control additives in cementing operations. Suitable fluid loss control additives may include, but are not limited to, cellulosic materials such as hydroxyethyl cellulose and carboxymethylhydroxyethyl cellulose, copolymers of 2-acrylamido-2-methylpropanesulfonic acid and acrylamide or N,N-dimethylacrylamide, graft copolymers comprising a backbone of lignin or lignite and pendant groups comprising at least one member selected from the group consisting of 2-acrylamido-2-methylpropanesulfonic acid, acrylonitirile, and N,N-dimethylacrylamide and or any combinations thereof. Fluid loss control additives may be present in any suitable amount. A suitable amount may include, but is not limited to, about 0.1% to about 5% BWOC, or about 0.3% to about 3% BWOC. One of ordinary skill in the art, with the benefit of this disclosure, will be able to select the appropriate type and amount of the fluid loss control additive to include in the cement compositions of the present invention for a particular application.

Cement compositions may experience rheological problems over the duration of the placement period if not properly prepared. One such problem may be the settling of solids in embodiments comprising cement compositions. If the solids are not adequately suspended in the composition, the composition may segregate and be unusable. Methods to counteract this issue may include the use of water viscosifying suspension additives such as polymeric additives or frequent agitation to maintain the solids suspension. Examples may include any viscosifier formulated in the optimal amount and/or polysaccharide biopolymer subgroups including: scleroglucan, carragenans, xanthan, welan, diutan gums, celluloses, hydroxyl ethyl celluloses as well as alternatives such as: synthetic polymer viscosifiers, e.g. high molecular weight acrylamide polymers, acrylic acid-acrylamide co-polymers, and acrylamide co-polymers. However, these solutions are expensive and time-consuming. The suspension additives may be present in any suitable amount, including, but not limited to, an amount of about 0.1% to about 7% BWOC. Alternatively, from about 0.3% to about 5% BWOC, or about 0.5% to about 3% BWOC.

Other additives suitable for use in subterranean cementing operations also may be added to the cement compositions as desired by those of ordinary skill in the art. Examples of such additives include, but are not limited to, set accelerators, weighting agents, lightweight additives, gas-generating additives, mechanical property enhancing additives, lost-circulation materials, dispersants, foaming agents, defoaming agents, thixotropic additives, gas, and combinations thereof. Specific examples of these, and other, additives include salts, fibers, hydratable clays, calcined shale, vitrified shale, microspheres, fly ash, slag, diatomaceous earth, metakaolin, rice husk ash, natural pozzolan, zeolite, cement kiln dust, lime, elastomers, resins, latex, combinations thereof, and the like. A person having ordinary skill in the art, with the benefit of this disclosure, will readily be able to determine the type and amount of additive useful for a particular application and desired result.

The cement compositions may set to have a desirable compressive strength. Compressive strength is generally the capacity of a material or structure to withstand axially directed pushing forces. The compressive strength may be measured at a specified time after preparation of the cement composition while the cement composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, July 2005.

By way of example, the cement compositions may develop a 24-hour compressive strength in the range of from about 50 psi (about 3.5 bar) to about 5000 psi (about 344.7 bar), alternatively, from about 100 psi (about 6.9 bar) to about 4500 psi (about 310.3 bar), or alternatively from about 500 psi (about 34.5 bar) to about 4000 psi (about 275.8 bar). Without limitation, the cement compositions may develop a compressive strength in 24 hours of at least about 50 psi (3.5 bar), at least about 100 psi (about 6.9 bar), at least about 500 psi (about 34.5 bar), or more. The compressive strength values may be determined using destructive or non-destructive methods at any temperature, however compressive strength development at temperatures above 400° F. may be of particular importance for potential use in subterranean formations having relatively high bottom hole static temperatures.

In some examples, the cement compositions may have desirable thickening times. The functionalized polyalkyleneimine retarder may be used for a wide range of temperatures. The functionalized polyalkyleneimine may operate at a bottomhole circulating temperature of about 50° F. to about 450° F., or about 150° F. to about 350° F., or about 150° F. to about 220° F., or about 300° F. to about 350° F. Suitable temperatures for the functionalized polyalkyleneimine retarder may include, but are not limited to, about 50° F., 100° F. 150° F., 160° F., 170° F., 180° F., 190° F., 200° F., 210° F., 220° F., 230° F., 240° F., 250° F., 260° F., 270° F., 280° F., 290° F., 300° F., 310° F., 320° F., 330° F., 340° F., 350° F., 370° F., 390° F., 410° F., 430° F., or 450° F. Thickening time typically refers to the time a fluid, such as the cement composition, remains in a fluid state capable of being pumped. As used herein, the "thickening time" is how long it takes for a cement composition to become unpumpable at a specified temperature and specified pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The cement compositions may have thickening times greater than about 1 hour, alternatively, greater than about 2 hours, greater than about 15 hours, greater than about 30 hours, greater than about 100 hours, or alternatively greater than about 190 hours at 500 psi (about 34.5 bar) and temperatures in a range of from about 50° F. to about 450° F., alternatively, in a range of from about 150° F. to about 350° F., and alternatively at a temperature range from about 300° F. to about 350° F.

In an embodiment, the cement composition comprising the functionalized polyalkyleneimine retarder may displays\ right angle set. Herein, right angle set refers to the near right angle (90 degrees plus or minus 5 degrees) increase in viscosity (or consistency) shown in a plot of viscosity (or consistency) over time for the cement composition comprising the functionalized polyalkyleneimine retarder. Specifically, it refers to the ability of the cement composition to exhibit a relatively constant viscosity for a period of time after they are initially prepared and while they are being placed in their intended locations in the wellbore, i.e., during the period when the cement composition is in motion. Eventually, the cement compositions quickly set such that the viscosity (or consistency) increases from about 5 Bc to equal to or higher than about 90 Bc in equal to or less than about 30 minutes. Alternatively, the viscosity may increase from about 5 Bc to or equal to about 130 Bc in equal to or less than about 30 minutes. This sudden jump in viscosity may be very desirable in preventing unwanted events such as gas or water migration into the slurry because it indicates the quick formation of impermeable mass from a gelled state after placement. A sufficient amount of the polyalkylene retarder may be included in the cement composition to provide the right angle set.

In accordance with the systems, methods, and cement compositions of the present disclosure, a cement composition may be introduced into a selected location and allowed to set therein. As will be appreciated, the selected location may any suitable location above ground or in a subterranean formation where it is desired for the cement composition to set into a hardened mass. For example, the selected location may be a wellbore annulus between a pipe string located in a subterranean formation and the subterranean formation or between the pipe string and a larger conduit. As described above, the methods and cement compositions of the present disclosure generally comprise a cement, the functionalized polyalkyleneimine retarder, and water.

As will be appreciated by those of ordinary skill in the art, the methods and cement compositions of the present disclosure may be used in a variety of subterranean applications, including primary and remedial cementing. The cement compositions may be introduced into a wellbore and allowed to set. The methods and cement compositions may comprise cement, the functionalized polyalkyleneimine retarder, and water. By way of example, in example primary cementing applications, a cement composition may be introduced into a wellbore or between a subterranean formation and a pipe string (or between a pipe string and a larger conduit) located in the subterranean formation. The cement composition may be allowed to set to form a hardened mass in the wellbore annulus. In addition, in example remedial cementing applications, a cement composition may be used, for example, in squeeze cementing operations or in the placement of cement plugs.

Referring now to FIG. 1, preparation of a cement composition in accordance with example systems, methods, and cement compositions will now be described. FIG. 1 illustrates a system 2 for preparation of a cement composition and delivery to a wellbore in accordance with certain systems, methods and cement compositions. As shown, the cement composition may be mixed in mixing equipment 4, such as a jet mixer, re-circulating mixer, or a batch mixer, for example, and then pumped via pumping equipment 6 to the wellbore. In some systems, methods and compositions, the mixing equipment 4 and the pumping equipment 6 may be disposed on one or more cement trucks as will be apparent to those of ordinary skill in the art. In some systems, methods and compositions, a jet mixer may be used, for example, to continuously mix the functionalized polyalkyleneimine retarder with the water (and other cement composition components) as it is being pumped to the wellbore.

Figure 2A:
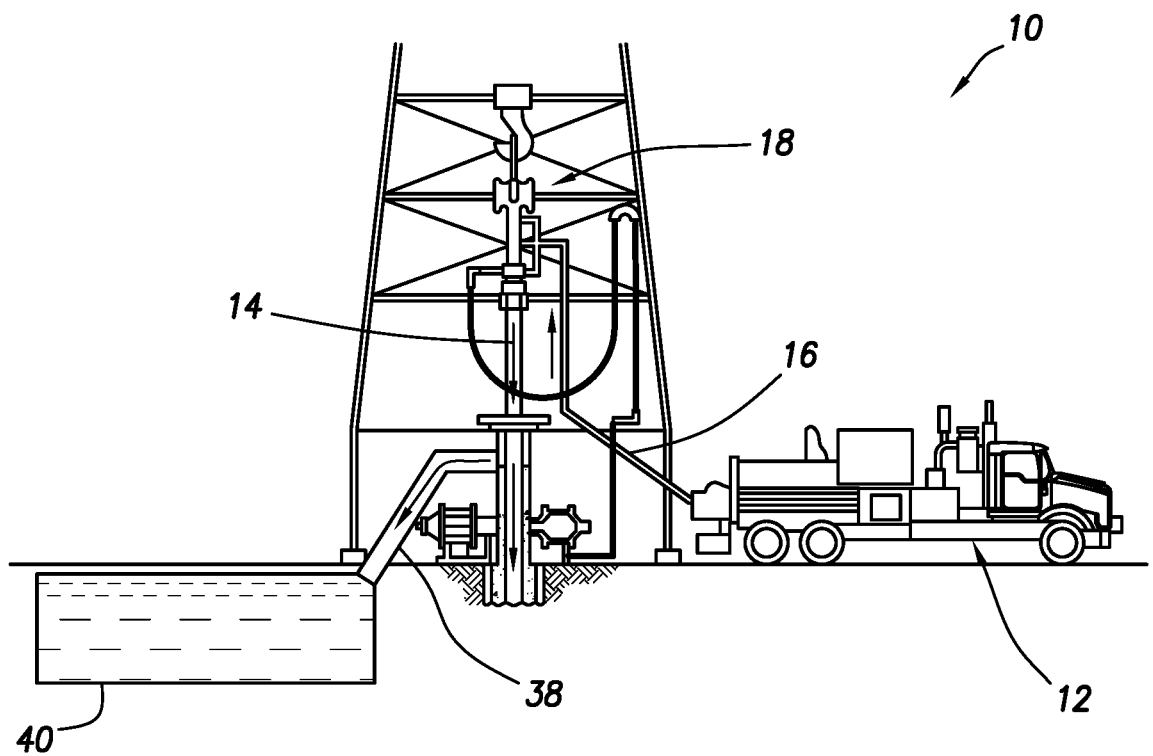
FIG. 2A is a schematic diagram that illustrates surface equipment that may be used in placement of a cement composition in a wellbore in accordance with certain examples.

An example technique for placing a cement composition into a subterranean formation will now be described with reference to FIGS. 2A and 2B. FIG. 2A illustrates surface equipment 10 that may be used in placement of a cement composition in accordance with certain systems, methods and cement compositions. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
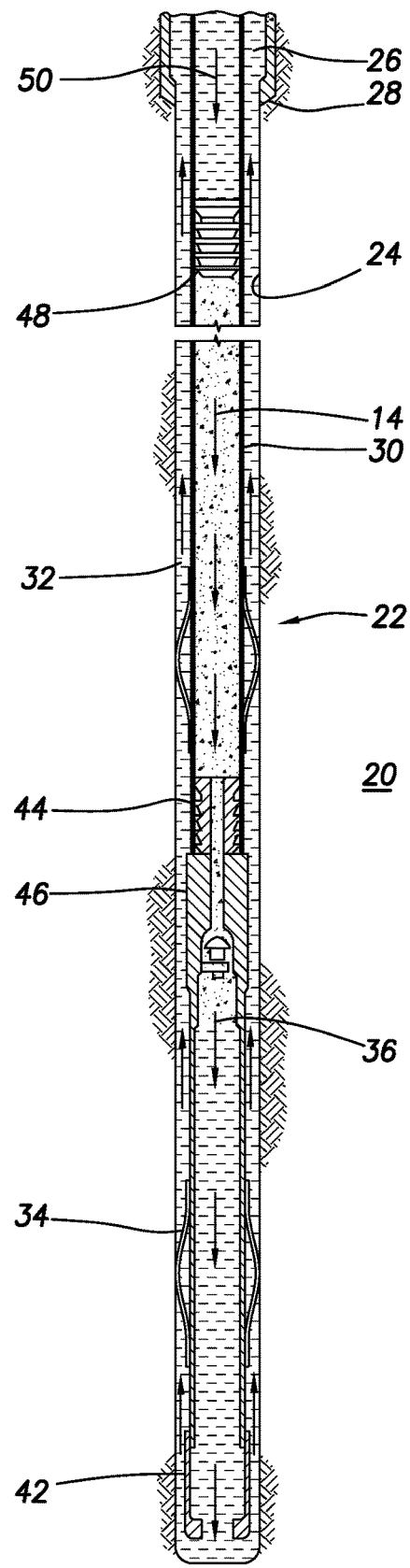
FIG. 2B is a schematic diagram that illustrates placement of a composition into a wellbore annulus in accordance with certain examples.

Turning now to FIG. 2B, the cement composition 14 may be placed into a subterranean formation 20 in accordance with example systems, methods and cement compositions. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustration, a surface casing 26 has been inserted into the wellbore 22. The surface casing 26 may be cemented to the walls 24 of the wellbore 22 by cement sheath 28. In the illustration, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device should rupture to allow the cement composition 14 through the bottom plug 44. In FIG. 2B, the bottom plug 44 is shown on the landing collar 46. In the illustration, a top plug 48 may be introduced into the wellbore 22 behind the cement composition 14. The top plug 48 may separate the cement composition 14 from a displacement fluid 50 and also push the cement composition 14 through the bottom plug 44.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like Accordingly, this disclosure describes systems, methods, and compositions that may relate to subterranean operations. The systems, methods, and compositions may further be characterized by one or more of the following statements:

Statement 1. A method of cementing comprising: providing a cement composition comprising a hydraulic cement, water, and a functionalized polyethyleneimine retarder; placing the cement composition in a selected location; and allowing the cement composition to set.

Statement 2. The method of statement 1, wherein the cement composition has a density in a range of from about 4 pounds per gallon to about 25 pounds per gallon, and wherein the water is present in an amount sufficient to form a pumpable slurry.

Statement 3. The method of statements 1 or 2, wherein the hydraulic cement comprises at least one hydraulic cement selected from the group consisting of Portland cement, pozzolan cement, gypsum cement, high-alumina-content cement, slag cement, silica cement, and any combination thereof.

Statement 4. The method of any one of statements 1 to 3, wherein the functionalized polyalkyleneimine retarder has the general formula below:

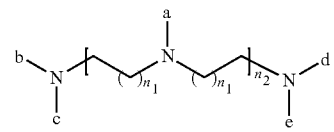

Where $n_1$ ranges from 1 to 10, $n_2$ ranges from 1 to 1,000, and a, b, c, d, and e are individually selected from the group consisting of H, an alkyl group, $CH_2H_2PO_3$, $(CH_2)_3SO_3H$, and any combination thereof, wherein at least one of a, b, c, d, e is $CH_2H_2PO_3$.

Statement 5. The method of any one of statements 1 to 4, wherein the functionalized polyalkyleneimine retarder comprises at least one functionalized polyalkyleneimine selected from the group consisting of functionalized polyethyleneimine, functionalized polypropyleneimine, functionalized poly(butylene imine), and any combination thereof.

Statement 6. The method of any one of statements 1 to 5, wherein the functionalized polyalkyleneimine retarder comprises at least one functional group selected from the group consisting of phosphonate, sulfonate, carboxylate, nitrates, hydroxyls, and any combination thereof.

Statement 7. The method of any one of statements 1 to 6, wherein the functionalized polyalkyleneimine retarder comprises a functionalized polyalkyleneimine that is branched.

Statement 8. The method of any one of statements 1 to 7, wherein the functionalized polyalkyleneimine retarder comprises a functionalized polyalkyleneimine having a number average molecular weight of from about 400 to about 10,000.

Statement 9. The method of any one of statements 1 to 8, wherein the cement composition further comprises a strength retrogressive additive comprising silica flour.

Statement 10. The method of any one of statements 1 to 9, wherein the functionalized polyethyleneimine retarder is present in the cement composition in an amount to provide a thickening time of about 6 hours or longer at temperatures in a range of from about 50° F. to about 450° F. with no additional set retarders.

Statement 11. The method of any one of statements 1 to 10, wherein the cement composition is placed into a wellbore having a bottom hole circulating temperature of from about 50° F. to about 450° F., wherein the cement composition has a thickening time of about 6 hours or longer with no additional set retarders in the cement composition, the cement composition developing a 24 hour compressive strength of about 1500 psi or greater.

Statement 12. The method of any one of statements 1 to 11, wherein the functionalized polyethyleneimine retarder is present in the cement composition in an amount of about 0.1% to about 5% by weight of the hydraulic cement, wherein the functionalized polyethyleneimine retarder comprises a functionalized polyethyleneimine that is branched and has a number average molecular weight of from about 400 to about 10,000, wherein the functionalized polyethyleneimine retarder comprises phosphonate functional groups, and wherein the placing the cement composition comprises pumping the cement composition into a wellbore annulus.

Statement 13. The method of any one of statements 1 to 12, wherein the selected location is a wellbore annulus in a primary cementing operation.

Statement 14. The method of any one of statements 1 to 13, wherein the placing the cement composition comprises pumping the cement composition via pumping equipment into a well bore.

Statement 15. A cement composition comprising: hydraulic cement; water; and a functionalized polyethyleneimine retarder.

Statement 16. The cement composition of statement 15, wherein the cement composition has a density in a range of from about 4 pounds per gallon to about 25 pounds per gallon, and wherein the water is present in an amount sufficient to form a pumpable slurry.

Statement 17. The cement composition of statements 15 or 16, wherein the functionalized polyalkyleneimine retarder has the general formula below:

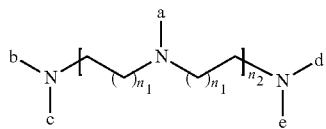

Where m ranges from 1 to 10, $n_2$ ranges from 1 to 1,000, and a, b, c, d, and e are individually selected from the group consisting of H, an alkyl group, $CH_2H_2PO_3$, $(CH_2)_3SO_3H$, and any combination thereof, wherein at least one of a, b, c, d, e is $CH_2H_2PO_3$.

Statement 18. The cement composition of any of the preceding statements, wherein the functionalized polyalkyleneimine retarder comprises at least one functionalized polyalkyleneimine selected from the group consisting of functionalized polyethylenimine, functionalized polypropyleneimine, functionalized poly(butylene imine), and any combination thereof.

Statement 19. The cement composition of any of the preceding statements, wherein the functionalized polyalkyleneimine retarder comprises at least one functional group selected from the group consisting of phosphonate, sulfonate, carboxylate, nitrates, hydroxyls, and any combination thereof.

Statement 20. The cement composition of any of statements 16 to 17, wherein the functionalized polyalkyleneimine retarder comprises a functionalized polyalkyleneimine that is branched and has a number average molecular weight of from about 400 to about 10,000.

To facilitate a better understanding of the present disclosure, the following examples of certain aspects of some of the systems, methods and cement compositions are given. In no way should the following examples be read to limit, or define, the entire scope of the disclosure.

Example 1

A functionalized polyalkyleneimine retarder was synthesized using branched polyethylenimine or PEI, formaldehyde and phosphorous acid. The PEI had a number average molecular weight greater than 600. The amount of formaldehyde and phosphorus acid used were approximately 35-50% by weight of PEI and 30-50% by weight of PEI, respectively. A typical procedure for modification of the polymer is as follows: 10 grams of PEI was put into a three-necked round bottom flask, to that, concentrated HCl was added. This was done to make the pH of the overall solution 1. It was then purged with nitrogen. The resulting solution was a light-yellow color. To this solution, 3.375 grams of phosphorous acid was added and heated to reflux. Once the solution reached the reflux temperature, 10 grams, approximately 37% in water, solution of formaldehyde was added drop wise over the course of an hour. The solution then changed from light-yellow to dark red in color. The mixture was further refluxed for an additional 6 hours. After the 6 hours, the solution was cooled and then used as a cement retarder with no further purification. The reaction mechanism is shown below.

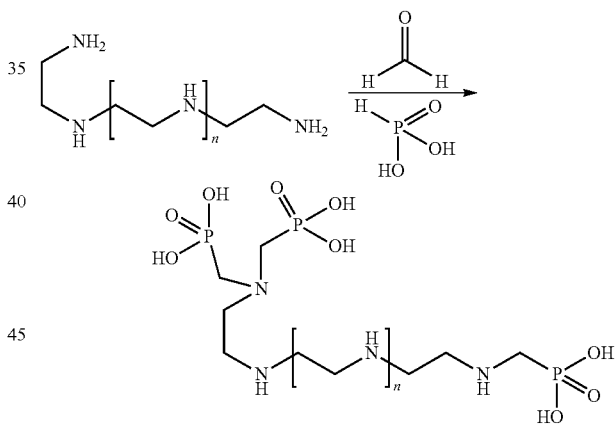

Example 2

The performance of the functionalized polyalkyleneimine retarder was tested. A base cement composition was prepared to test the functionalized polyalkyleneimine retarder using 100 BWOC of class G cement, 44.15 BWOC water, 35 BWOC coarse silica flour as a strength retrogression additive. The base cement composition had a density of 16.8 pounds per gallon ("ppg") (about 2,013 kilogram per cubic meter). The thickening time of the cement composition as a function of temperature and the concentration of the functionalized polyalkyleneimine retarder was determined. These results are presented in Table 1. The performance of the functionalized polyalkyleneimine retarder at different temperatures between 150° F. to 300° F. (66° C. to 149° C.) is plotted in FIG. 3.

TABLE 1

| Temperature (° F.) | Concentration of Functionalized Polyalkyleneimine Retarder (% BWOC) | Thickening Time (minutes) |
|---|---|---|
| 150 (66° C.) | 0.05 | 200 |
|  | 0.1 | 440 |
|  | 0.18 | 920 |
| 220 (104° C.) | 0.2 | 200 |
|  | 0.3 | 300 |
|  | 0.4 | 430 |
| 270 (132° C.) | 0.3 | 130 |
|  | 0.43 | 221 |
|  | 0.6 | 410 |
| 300 (149° C.) | 0.5 | 240 |
|  | 0.6 | 320 |
|  | 0.65 | 365 |
| 330 (166° C.) | 0.6 | 480 |
| 350 (177° C.) | 0.65 | 521 |

Figure 3:
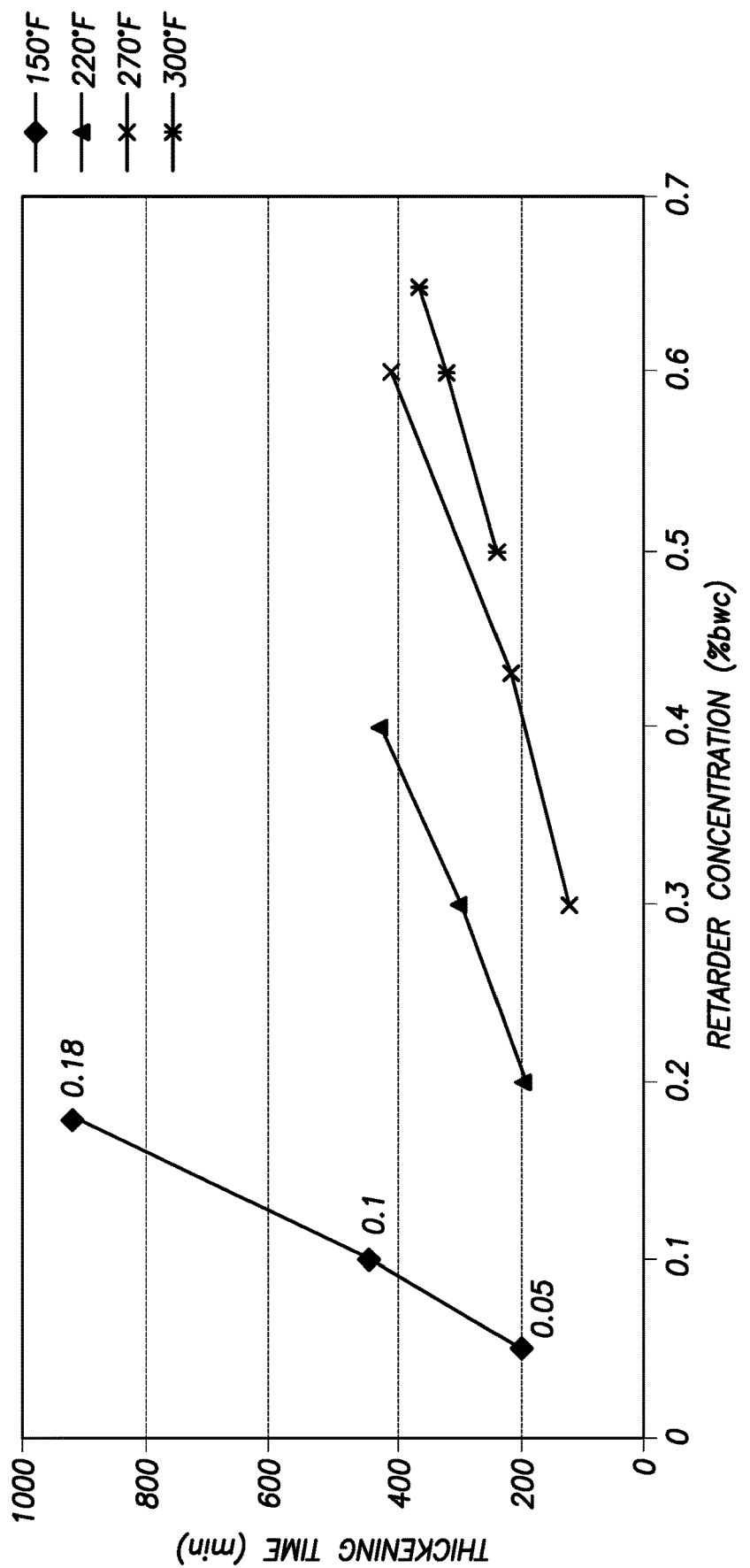
FIG. 3 is a graph that illustrates the concentration of the functionalized polyalkyleneimine retarder versus the thickening time at various temperatures.
Figure 4:
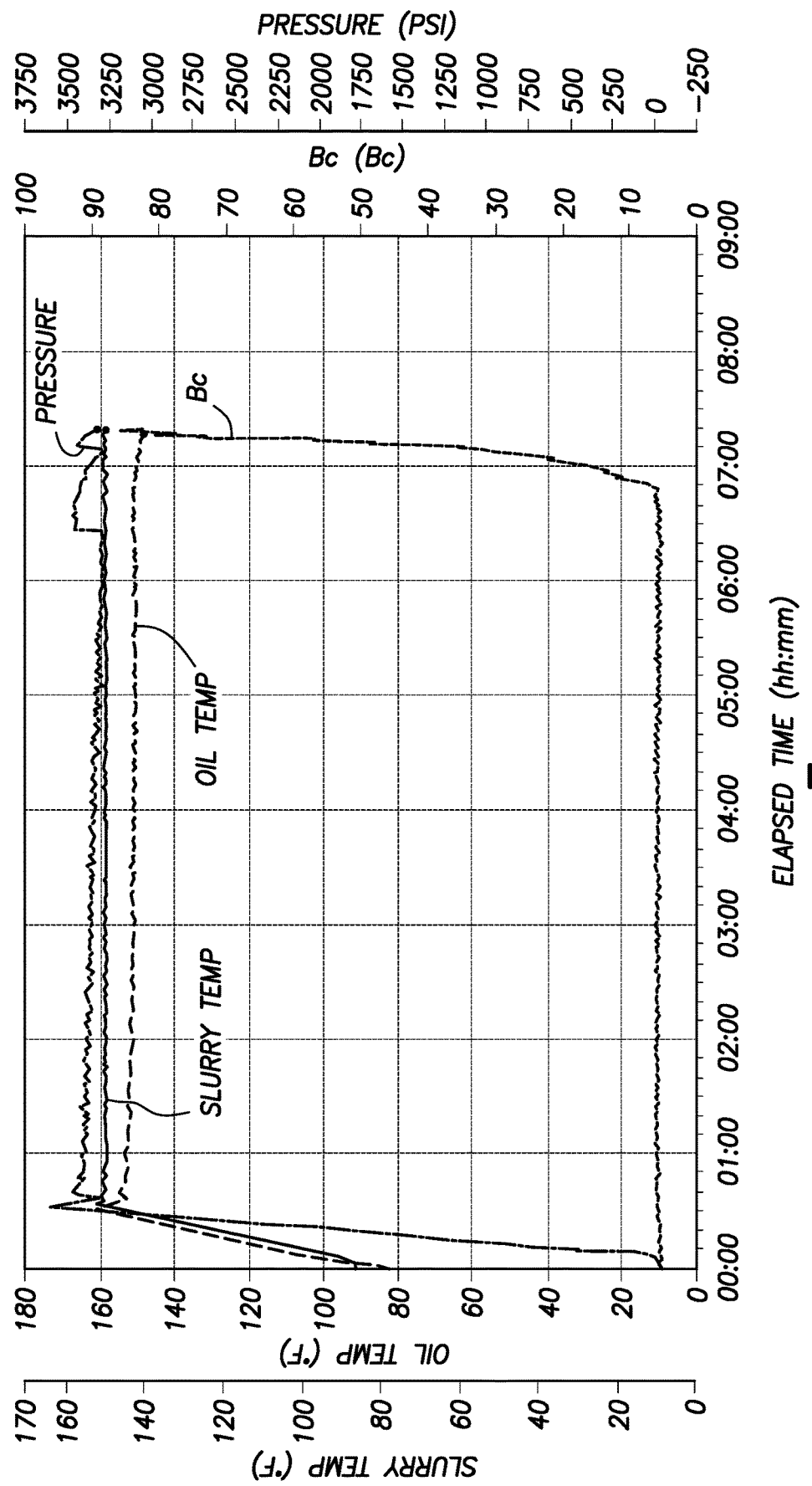
FIGS. 4 and 5 are graphs that illustrate a thickening time plot of the cement slurring using a functionalized polyalkyleneimine retarder at 150° F. and at 350° F., respectively.
Figure 5:
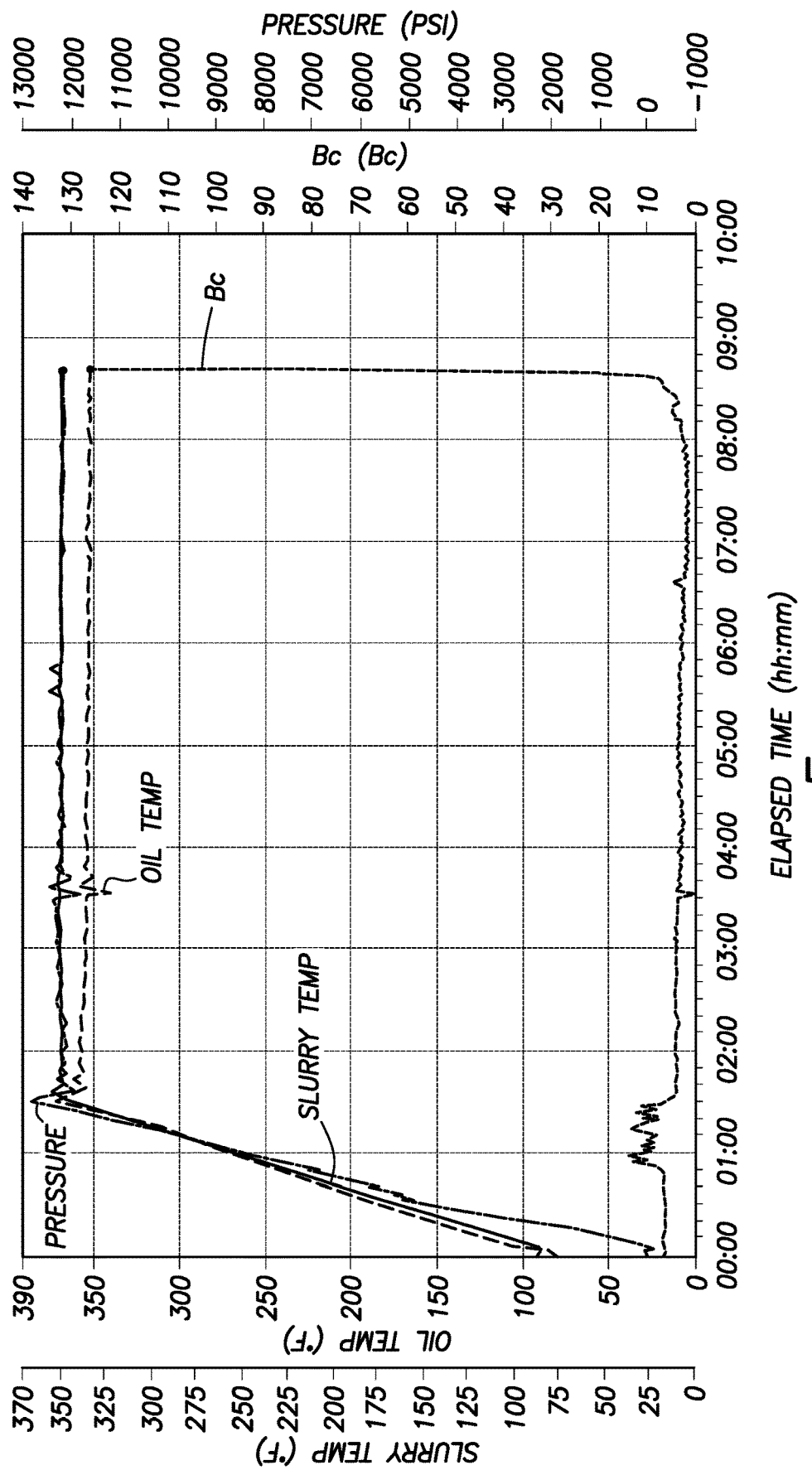

As one can observe from FIG. 3, the thickening time of the cement compositions obtained using the functionalized polyalkyleneimine retarder are consistent and predictable. Furthermore, the functionalized polyalkyleneimine retarder provides a right angle set to the cement composition in all temperatures. Two representative thickening time plots, at 150° F. and 350° F. (66° C. to 177° C.), are show in FIGS. 4 and 5, respectively. Right angle set may be a defining function of a retarder to reduce the probability of gas migration through the cement composition.

Example 3

The functionalized polyalkyleneimine retarder does not show any adverse effect on the strength development of the cement composition and 500 psi (34.5 bar) of compressive strength was achieved within 24 hours of time in the ultrasonic cement analyzer, see Table 2. It can be observed from Table 1 and Table 2 that the time difference between the 70 Bc achievement and 500 psi (34.5 bar) strength development is short, which attributes to the lower wait on cement time.

TABLE 2

| Concentration of Functionalized Polyalkyleneimine Retarder (% BWOC) | BHCT (° F.) | BHST (° F.) | 500 psi (hh:mm) | 24 h strength (PSI) |
|---|---|---|---|---|
| 0.1 | 150 (65° C.) | 180 (82° C.) | 08:04 | 3718 (256.3 bar) |
| 0.2 | 220 (104° C.) | 250 (121° C.) | 07:07 | 2286 (157.6 bar) |
| 0.6 | 270 (132° C.) | 300 (148° C.) | 09:50 | 3350 (231 bar) |
| 0.65 | 300 (148° C.) | 330 (165° C.) | 07:33 | 2093 (144.3 bar) |
| 0.65 | 350 (176° C.) | 370 (187° C.) | 16:04 | 1522 (104.9 bar) |

Example 4

The rheology of the cement compositions was also tested in the presence and absence of the functionalized polyalkyleneimine retarder. This was done to understand the dispersing effect of the functionalized polyalkyleneimine retarder. The results are shown in Table 3. The rheology results show that the functionalized polyalkyleneimine retarder is dispersing in nature. At high temperatures and high concentrations of the functionalized polyalkyleneimine retarder, suspending agents are needed to stabilized the cement slurry, see Table 1.

TABLE 3

| Concentration of R (% BWOC) | Temperature (° F.) | Fann ® 35 Viscometer reading ||||||| 
|---|---|---|---|---|---|---|---|---|
|  |  | 3 | 6 | 30 | 60 | 100 | 200 | 300 |
| 0 | 80 (27° C.) | 19 | 23 | 45 | 54 | 62 | 84 | 100 |
| 0.3 | 80 (27° C.) | 7 | 8 | 11 | 15 | 20 | 33 | 48 |
| 0.3 | 190 (88° C.) | 11 | 14 | 24 | 27 | 30 | 39 | 50 |

Therefore, the present disclosure is well adapted to attain the ends and advantages mentioned as well as those that are inherent therein. The particular systems, methods and cement compositions disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative systems, methods and cement compositions disclosed above may be altered or modified and all such variations are considered within the scope and spirit of the present disclosure. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

What is claimed is:

1. A method of cementing comprising:
   providing a cement composition comprising:
   a hydraulic cement,
   water, and
   a functionalized polyalkyleneimine retarder;
   placing the cement composition in a selected location; and
   allowing the cement composition to set,
   wherein the cement composition has a thickening time of about 6 hours or longer with no additional set retarders in the cement composition, the cement composition developing a 24-hour compressive strength of about 1500 psi or greater, wherein the functionalized polyalkyleneimine retarder has the general formula below:

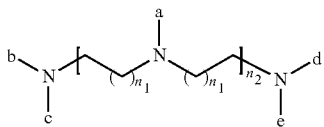

where $n_1$ ranges from 1 to 10, $n_2$ ranges from 25 to 1,000, and a, b, c, d, and e are individually selected from the group consisting of H, an alkyl group, $CH_2H_2PO_3$, $(CH_2)_3SO_3H$, and any combination thereof, wherein at least one of a, b, c, d, e is $CH_2H_2PO_3$.

2. The method of claim 1, wherein the cement composition has a density in a range of from about 4 pounds per gallon to about 25 pounds per gallon, and wherein the water is present in an amount sufficient to form a pumpable slurry.

3. The method of claim 1, wherein the hydraulic cement comprises at least one hydraulic cement selected from the group consisting of Portland cement, pozzolan cement, gypsum cement, high-alumina-content cement, slag cement, silica cement, and any combination thereof.

4. The method of claim 1, wherein the functionalized polyalkyleneimine retarder has the general formula below:

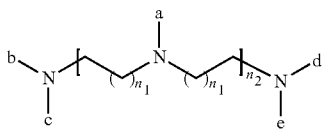

where $n_1$ ranges from 1 to 10, $n_2$ ranges from 50 to 1,000, and a, b, c, d, and e are individually selected from the group consisting of H, an alkyl group, $CH_2H_2PO_3$, $(CH_2)_3SO_3H$, and any combination thereof, wherein at least one of a, b, c, d, e is $CH_2H_2PO_3$.

5. The method of claim 1, wherein the functionalized polyalkyleneimine retarder comprises at least one functionalized polyalkyleneimine selected from the group consisting of functionalized polyethyleneimine, functionalized polypropyleneimine, functionalized poly(butylene imine), and any combination thereof.

6. The method of claim 1, wherein the functionalized polyalkyleneimine retarder comprises at least one functional group selected from the group consisting of phosphonate, sulfonate, carboxylate, nitrates, hydroxyls, and any combination thereof.

7. The method of claim 1, wherein the functionalized polyalkyleneimine retarder comprises a functionalized polyalkyleneimine that is branched.

8. The method of claim 1, wherein the functionalized polyalkyleneimine retarder comprises a functionalized polyalkyleneimine having a number average molecular weight of from about 400 to about 10,000.

9. The method of claim 1, wherein the cement composition further comprises a strength retrogressive additive comprising silica flour.

10. The method of claim 1, wherein the functionalized polyalkyleneimine retarder is present in the cement composition in an amount to provide a thickening time of about 6 hours or longer at temperatures in a range of from about 50° F. to about 450° F. with no additional set retarders.

11. The method of claim 1, wherein the cement composition is placed into a wellbore having a bottom hole circulating temperature of from about 50° F. to about 450° F.

12. The method of claim 11, wherein the functionalized polyalkyleneimine retarder is present in the cement composition in an amount of about 0.1% to about 5% by weight of the hydraulic cement, wherein the functionalized polyalkyleneimine retarder comprises a functionalized polyalkyleneimine that is branched and has a number average molecular weight of from about 400 to about 10,000, wherein the functionalized polyalkyleneimine retarder comprises phosphonate functional groups, and wherein the placing the cement composition comprises pumping the cement composition into a wellbore annulus.

13. The method of claim 1, wherein the selected location is a wellbore annulus in a primary cementing operation.

14. The method of claim 1, wherein the placing the cement composition comprises pumping the cement composition via pumping equipment into a wellbore.

15. A cement composition comprising:
a hydraulic cement;
water; and
a functionalized polyalkyleneimine retarder,
wherein the cement composition has a thickening time of about 6 hours or longer with no additional set retarders in the cement composition, the cement composition developing a 24-hour compressive strength of about 1500 psi or greater, wherein the functionalized polyalkyleneimine retarder has the general formula below:

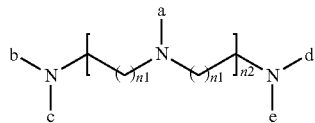

where $n_1$ ranges from 1 to 10, $n_2$ ranges from 25 to 1,000, and a, b, c, d, and e are individually selected from the group consisting of H, an alkyl group, $CH_2H_2PO_3$, $(CH_2)_3SO_3H$, and any combination thereof, wherein at least one of a, b, c, d, e is $CH_2H_2PO_3$.

16. The cement composition of claim 15, wherein the cement composition has a density in a range of from about 4 pounds per gallon to about 25 pounds per gallon, and wherein the water is present in an amount sufficient to form a pumpable slurry.

17. The cement composition of claim 15, wherein the functionalized polyalkyleneimine retarder comprises at least one functionalized polyalkyleneimine selected from the group consisting of functionalized polyethylenimine, functionalized polypropyleneimine, functionalized poly(butylene imine), and any combination thereof.

18. The cement composition of claim 15, wherein the functionalized polyalkyleneimine retarder comprises at least one functional group selected from the group consisting of phosphonate, sulfonate, carboxylate, nitrates, hydroxyls, and any combination thereof.

19. The cement composition of claim 15, wherein the functionalized polyalkyleneimine retarder comprises a functionalized polyalkyleneimine that is branched and has a number average molecular weight of from about 400 to about 10,000.

20. The cement composition of claim 15, wherein the functionalized polyalkyleneimine retarder is present in the cement composition in an amount to provide a thickening time of about 6 hours or longer at temperatures in a range of from about 50° F. to about 450° F. with no additional set retarders.

* * * * *